(12) United States Patent
Duvuvuei

(10) Patent No.: US 7,726,472 B1
(45) Date of Patent: Jun. 1, 2010

(54) SYSTEM AND METHOD FOR STORING, CLEANING, DRYING, AND HUNTING WITH DIAPHRAGM GAME CALLERS

(75) Inventor: Val Duvuvuei, Gahanna, OH (US)

(73) Assignee: Fresh Calls LLC, Gahanna, OH (US)

( * ) Notice: Subject to any disclaimer, the term of this patent is extended or adjusted under 35 U.S.C. 154(b) by 499 days.

(21) Appl. No.: 11/780,902

(22) Filed: Jul. 20, 2007

Related U.S. Application Data

(60) Provisional application No. 60/832,034, filed on Jul. 20, 2006.

(51) Int. Cl.
*B65D 85/00* (2006.01)
(52) U.S. Cl. .................. 206/207; 206/315.11
(58) Field of Classification Search ............. 206/315.1, 206/315.11, 205, 207, 579, 775, 477, 480, 206/493; 446/213, 202, 176
See application file for complete search history.

(56) References Cited

U.S. PATENT DOCUMENTS

| | | | |
|---|---|---|---|
| 4,614,503 A * | 9/1986 | Skoda .................. 446/213 |
| 4,883,171 A | 11/1989 | Carlton | |
| 4,897,067 A * | 1/1990 | Piper .................. 446/207 |
| 5,263,838 A * | 11/1993 | Meuser et al. ............. 224/191 |
| 5,785,574 A | 7/1998 | Sears | |
| 7,308,994 B1 * | 12/2007 | Vanicek .................. 224/222 |
| 2003/0060120 A1 * | 3/2003 | Waltz .................. 446/202 |
| 2005/0287901 A1 * | 12/2005 | Arndt, III .................. 446/27 |
| 2006/0174453 A1 * | 8/2006 | Herman .................. 24/3.12 |
| 2007/0155282 A1 * | 7/2007 | De Sousa .................. 446/418 |

\* cited by examiner

*Primary Examiner*—Jacob K Ackun, Jr.
(74) *Attorney, Agent, or Firm*—Standley Law Group LLP

(57) ABSTRACT

A system and method for storing, cleaning, drying, and hunting with diaphragm game callers. In an exemplary embodiment, a sturdy, sealable, watertight container is adapted to house and secure one or more diaphragm callers in a fixed position. It also adapted to separate and hold apart the multiple diaphragms of each game caller. Further embodiments include means to facilitate rinsing, by a suitable rinsing agent, the game caller and all its surfaces, including between the separated and held apart diaphragms of the game caller. It may also include means to facilitate the drying of the opposing surfaces of diaphragms.

33 Claims, 5 Drawing Sheets

SYSTEM AND METHOD FOR STORING, CLEANING, DRYING, AND HUNTING WITH DIAPHRAGM GAME CALLERS

This application claims the benefit of U.S. Provisional Application No. 60/832,034, filed Jul. 20, 2006, which is hereby incorporated by reference in its entirety.

BACKGROUND AND SUMMARY OF THE INVENTION

The present invention relates generally to systems and methods for storing, cleaning, drying, and hunting with diaphragm game callers.

Game callers are devices used by hunters to allure their prey by mimicking attractive calls of the species. Generally, each one is tuned to attract only one specific type of animal. A well-known type of game caller utilizes one or more diaphragms and is called a diaphragm caller. A hunter causes the diaphragm caller to emit sounds by placing the caller into his mouth, either against the roof of his mouth or, in so-called "lip calls", between his lip and teeth, and blowing across the call.

Typically, these diaphragm callers comprise a pair of generally rectangular or horseshoe-shaped frame elements supporting one or more strips of pre-tensioned diaphragm material such as latex, rubber, or the like. The diaphragm is held by the frame along its edges and at the rear, and is free to vibrate and produce sound at its outward end.

Diaphragm callers are relatively small objects that are easily lost if they are not properly stored. They are also extremely fragile and easily broken. Many hunters develop close, even superstitious, ties to their callers and become forlorn if they are lost or broken. Therefore, secure, portable containers that can be used during a hunt as well as between hunts are useful and desirable devices. During a hunt, it is also likely that the hunter will need to carry many diaphragms to accommodate all the types of game the hunter may find. Therefore, there is a need for a portable container to effectively hold multiple diaphragm callers.

Diaphragm callers can also become very dirty over time from the user's saliva and from dirt-ridden landscapes. Therefore, there is also a need for a container that may be used for cleaning the diaphragms as well as store them.

U.S. Pat. No. 4,883,171 shows a container that houses a number of diaphragm game callers in stacked, upright fashion separately from one another in a small plastic container. However, this device does not separate or hold apart any of the diaphragms of the game caller, secure the game caller in a fixed position inside of a sealed watertight container, facilitate rinsing of the entire game caller in a sealed container, or facilitate drying between the separated and held apart diaphragms of the game caller.

U.S. Pat. No. 4,897,067 shows a container that separates two diaphragms with a small clip-like device. However, this device does not separate more than two diaphragms of a game caller, secure the game caller in a fixed position inside a sealed watertight container practical for any storing/traveling situation, facilitate rinsing of the game caller in a sealed watertight container, or facilitate the drying of the game caller in sealed watertight container. It is also easily lost, misplaced, or dropped and is not practical in a hunting situation.

Exemplary embodiments of the present invention may include one or more novel features that provide advantages over the prior art. Exemplary embodiments of the present invention may include a system that is adapted to hold at least one diaphragm game caller. For example, one embodiment of a container may be adapted to separate and hold apart the respective diaphragms of multiple diaphragm game callers. In some exemplary embodiments, the game callers may be rendered easily accessible and instantly capable of optimum tonal performance. In further embodiments, a container may facilitate rinsing and drying of at least one entire game caller.

In one exemplary embodiment, a sturdy, sealable, watertight container that is adapted to house and secure one or more diaphragm callers in a fixed position is provided such that the diaphragm game callers may be in immediate readiness and instant capability of providing optimum tonal performance for the user. Furthermore, it may separate and hold apart the multiple diaphragms of the game callers when in use. Furthermore, such example may be fully functional and practical to use in any hunting, storage, or travel situation or application. The example is adapted to allow diaphragm game callers to be separated in the field at the end of a hunt. Such example may also easily fit into and out of a pocket. Further embodiments may include means to facilitate rinsing of at least one game caller and all its surfaces, including between separated and held apart diaphragms. It may also include means to facilitate the drying of separated opposing surfaces of diaphragms. As a result of one or more of these features, an exemplary embodiment may aid in prolonging the life of a game caller.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are described with reference to the following figures. In reference, like numerals refer to like matter throughout.

Figure 1:
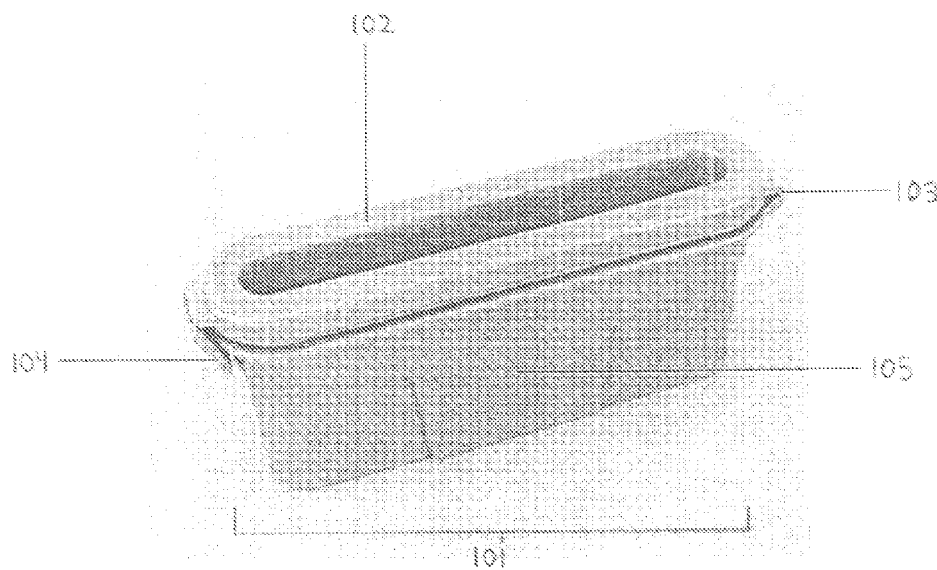
FIG. 1 is a perspective view of one exemplary embodiment of a container of the present invention with the lid closed.

FIG. 1 shows an exemplary embodiment of an improved container 101 of the present invention in a closed position. An elongated lid 102 is sized to fit relationally over an elongated reservoir 105. The outside top of lid 102 may be shaped in a generally concave fashion, sufficiently concave so as to extend into the elongated reservoir 105. In this example, hinge 103 may be affixed to an end of both lid 102 and reservoir 105. Hinge 103 may serve as a permanent connecting link between lid 102 and reservoir 105. A hinged latch 104 may be affixed at the end of lid 102 opposite hinge 103 to detachably secure the elongated lid 102 to the elongated reservoir 105.

A container's shape or size is not limited to what is shown, but may vary for usability purposes or design purposes—e.g., oval, circular, square, rectangular, thinner, wider, etc. It should also be noted that in some exemplary embodiments a lid may not be permanently connected to a reservoir such as by a hinge. In other words, a lid may be a separate component in some exemplary embodiments. Furthermore, some exemplary embodiments may not include a latching means to secure a lid to a reservoir in a closed position. For example, some exemplary embodiments may utilize a friction fit between a lid and a reservoir, and some exemplary embodiments may simply utilize force provided by a user to secure a lid to a reservoir. Other variations may be possible in exemplary embodiments of the present invention.

Figure 2:
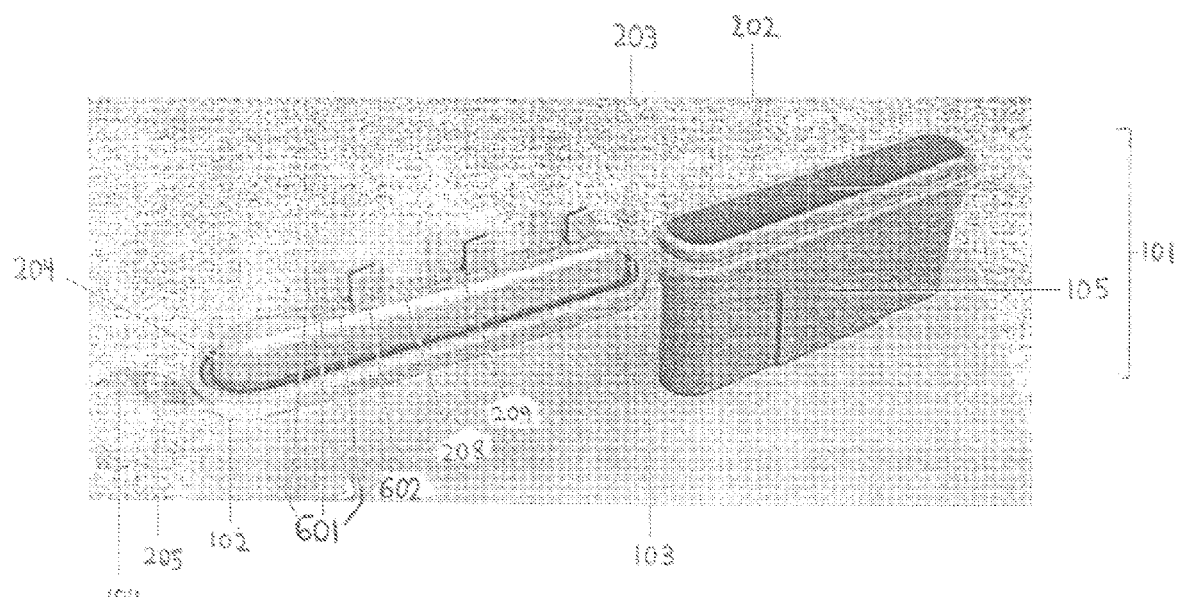
FIG. 2 is a perspective view of the container of FIG. 1 with the lid open.

FIG. 2 shows container 101 with lid 102 open. At least one prong/keeper assembly 209 may be provided on a shared base 208, which may be associated with the underside of a lid bottom 204. In this example, three prong/keeper assemblies 209 are provided, each comprising at least one prong 601 and a keeper 602. In this example, prong/keeper assemblies 209 are aligned in generally linear fashion and parallel with the elongated shape of lid 102. The plurality of prong/keeper assemblies 209 may also be formed or aligned other than in a linear or parallel fashion (e.g., one prong/keeper assembly 209 may be stacked vertically upon another), and they may be employed in quantities other than what is shown. The container 101 may be adapted to allow diaphragm game callers to be separately stored with the diaphragms separated in the field at the end of a hunt. Also, in this example, a slot 205 (e.g., a rectangular slot) is shown on hinged latch 104 to be used in detachably securing lid 102 to reservoir 105.

In further embodiments, container 101 may have a plurality of lids. These lids can be added to any surface of the container. In an exemplary embodiment, a separate lid may be added across the top portion of the reservoir 102. In this manner, the reservoir 101 may be elongated further or have a larger width than previous embodiments. The lids may have hinges on either side, such that the lids would swing open. There may also be a securing feature used to secure the lids together when they are closed. This securing feature may be a latch or the like, and it may be attached to both the lids, one of the lids, or the container 101. A plurality of prong/keeper assemblies 209 or the like may be attached to each lid. This would allow for a greater number of diaphragm game callers to be carried in the container 101. A second lid may also be added to the bottom of the reservoir 102. In this manner, the diaphragm game callers may be stacked inside the reservoir 102 when the lids are closed.

Figure 3:
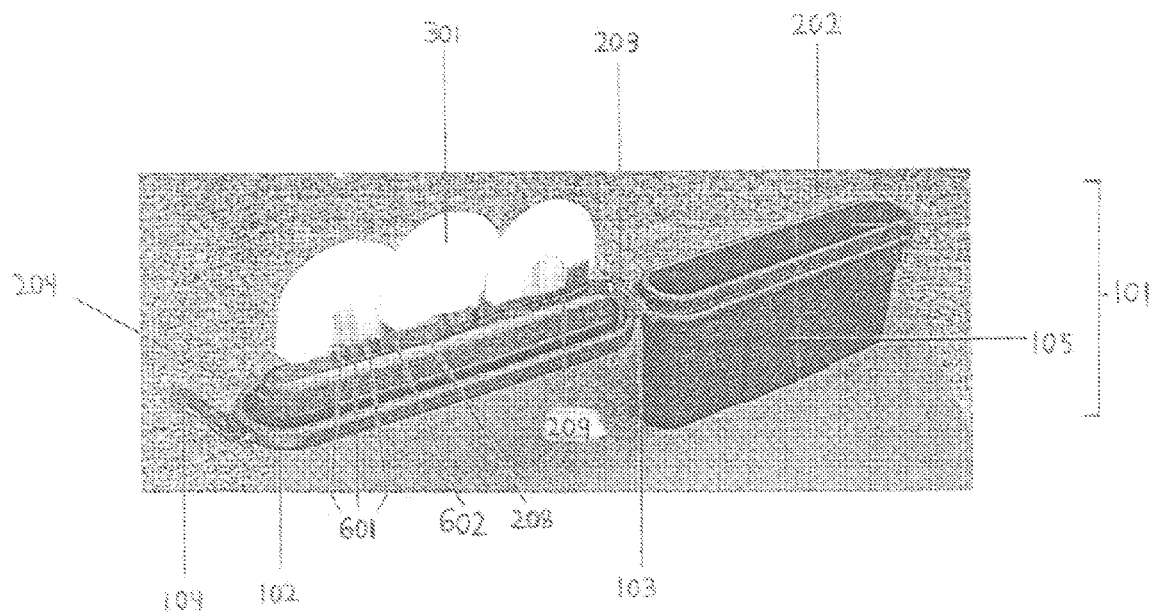
FIG. 3 is a perspective view of the container of FIG. 1 with the lid open and holding diaphragm game callers.

FIG. 3 shows container 101 with the lid 102 open. A diaphragm game caller 301 is shown attached to each of the prong/keeper assemblies 209. Thus, when the lid 102 is closed in this exemplary embodiment, the diaphragm game callers 301 are held upside-down and suspended inside reservoir 105. Once the lid 102 is closed and latched in this example (latching process described in FIG. 5), the diaphragm game callers 301 may be prepared for hunting, storage, and/or travel. In other exemplary embodiments, it should be recognized that a prong/keeper assembly may be provided in association with a reservoir (i.e., instead of a lid).

Figure 4:
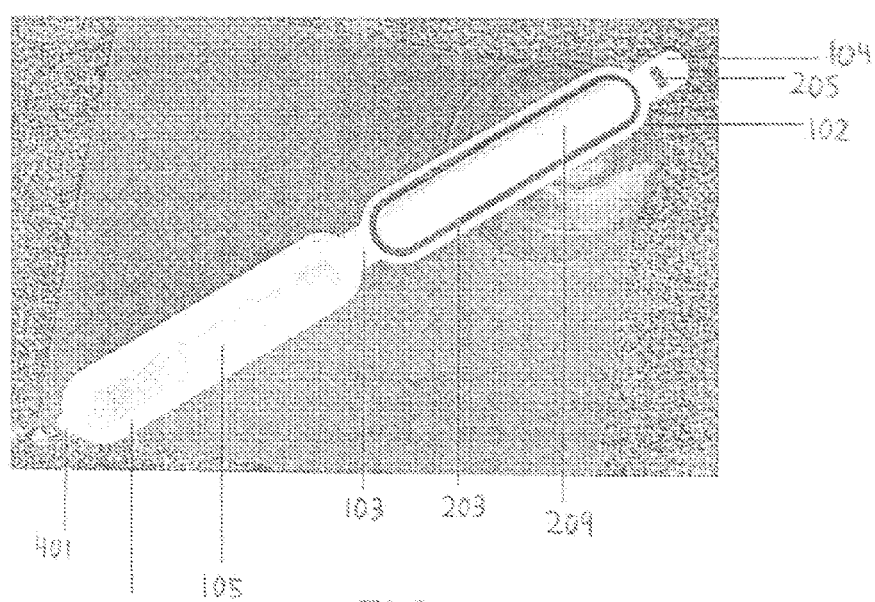
FIG. 4 is a top plan view of one exemplary embodiment of a reservoir and open lid of a container of the present invention with a gasket in a gasket channel.
Figure 5:
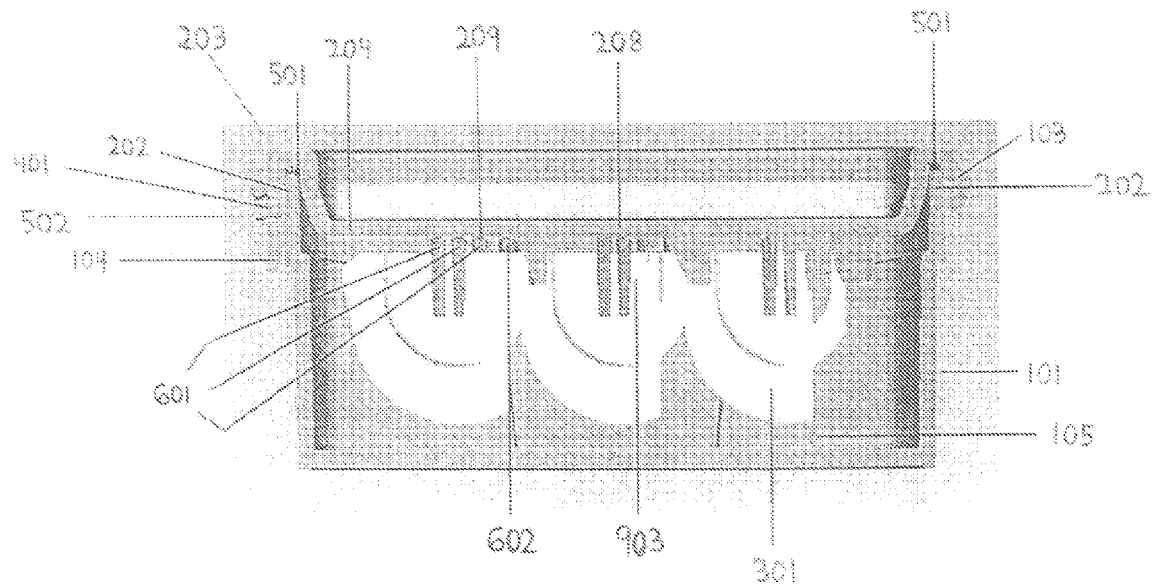
FIG. 5 is a sectional side view of one exemplary embodiment of a container of the present invention in a fully closed, latched, and sealed position with diaphragm game callers secured in the cavity of reservoir.

FIG. 4 shows another exemplary embodiment of a container 101 in which a recessed gasket channel 203 is shown positioned generally around the circumference of the underside of the lid bottom. A gasket may be sufficiently sized to fit and remain held in gasket channel 203. Optionally, in some exemplary embodiments, a reservoir may additionally or alternatively include a suitably positioned gasket. Top outer rim 202 of reservoir 105 may be sized and fitted relationally to gasket channel 203 to enter into gasket channel 203 when lid 102 is closed. By this relationship, top outer rim 202 of reservoir 105 may thus contact and compress a gasket inside gasket channel 203, thereby forming a watertight seal between lid 102 and reservoir 105 such as shown in FIG. 5. Other watertight configurations may be possible. For instance, in other exemplary embodiments, a reverse watertight configuration may be provided (e.g., a reservoir may have a gasket channel and gasket).

Also, in this example, a latch catch 401 may be provided on the opposite side of the reservoir 105 as the hinge 103. In such exemplary embodiments, it should be recognized that a latch and latch catch may have any suitable positions.

FIG. 5 shows an example of a sectional view of container 101 with lid 102 closed, latched, and sealed to reservoir 105. In this example, pluralities of prong/keeper assemblies 209 are affixed to the underside of lid bottom 204 via their shared base 208. Pluralities of diaphragm game callers 301 may be fixedly secured and held extended into a cavity of reservoir 105 via a plurality of prong/keeper assembly 209. Gasket 501 is compressed in gasket channel 203 by top outer rim 202 of reservoir 105, sealing and rendering lid 102 and reservoir 105 substantially watertight.

In this exemplary embodiment, a latch catch 401 is affixed at the end of reservoir 105 opposite hinge 103. The lid 102, in a fully closed position, holds the hinged latch 104 and rectangular slot 205 in relation to and aligned with latch catch 401. The rectangular slot 205 is suitably sized to allow insertion of the latch catch 401. Extending from the bottom of the latch catch 401 may be at least one slightly raised protuberance 502. The latch catch 401 and at least one protuberance 502 may be inserted into and through rectangular slot 205 until the at least one protuberance 502 may be abutted against the outside surface of hinged latch 104, to prevent undesired opening. This constant, held relational position of hinged latch 104 to latch catch 401 renders lid 102 latched to reservoir 105. Other suitable latch configurations may be used in other exemplary embodiments. Also, as noted above, other suitable means for securing a lid to a reservoir may be used in other exemplary embodiments.

The latch/latch catch system and the gasket/outer rim system described above are just examples of how to secure the lid 102 to the reservoir 105. Both systems may be used, just one system, or any other suitable system known in the art.

To clean the diaphragm game callers in one exemplary embodiment, they may be first be secured to the lid 102. The prong/keeper assemblies are used to separate the diaphragms 903, and promote satisfactory cleansing and drying of the diaphragms 903 (see examples of diaphragms in FIGS. 5, 9, and 10). A sufficient amount of suitable cleaning agent (e.g., water or any other suitable cleaning or rinsing agent) may be added into the reservoir 105. The lid 102 may then be closed and latched, and the container is sealed. The container 101 may be agitated (e.g., turned topside down and agitated gently). In this example, this agitation introduces the rinsing agent to the exposed, separated, surfaces of the individual diaphragms 903 and the entire diaphragm game caller 301. After agitation, the rinsing agent may be emptied from the reservoir 105. The lid 102 may then be left at least partially open until the diaphragm game callers 301 and reservoir 105 are desirably dried, or the lid 102 may be closed and latched for storage, travel, or hunting. Optionally, a container may be stored with a rising agent and/or at least one diaphragm game caller therein.

FIGS. 6 to 9 reference an exemplary embodiment of a prong/keeper assembly 209 and its relationship to a diaphragm game caller 301. The prong/keeper assembly 209 is not limited to use with the container described herein. It may be used separately and apart from any container, or as a detachable assembly. The prong/keeper assembly 209 may also be made individually and attachable to other container(s) interchangeably—e.g., as in a storage or carrying case, or another case not necessarily suitable for hunting applications.

Figure 6:
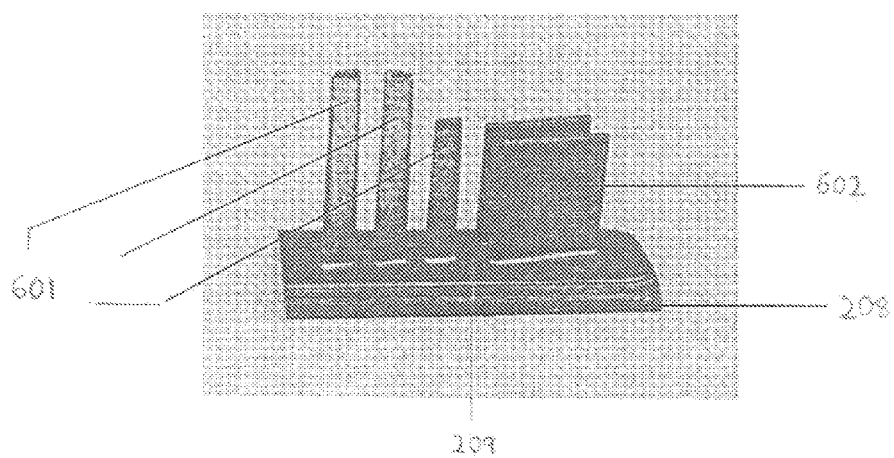
FIG. 6 is a perspective view of one exemplary embodiment of a prong/keeper assembly of the present invention.

FIG. 6 shows an example of a general parallel relationship of at least one prong 601 to a keeper 602. A plurality of prongs 601 (in this instance three, but this may vary) may be generally equidistant and parallel to each other, of generally smooth, exposed surfaces, and may be upstanding and extending in a generally perpendicular fashion from an affixed position to a shared base 208. The prongs size or shape may vary in height, width, breadth, surface texture, etc., both collectively or individually. In one embodiment, the prong closest to the keeper 602 is shorter than the remaining prongs. Also, a prong may extend in any suitable direction, and multiple prongs may not share the same base in some exemplary embodiments. An inwardly sloped, wedge-shaped keeper 602 may be secured to the same shared base 208 or a separate base and in proximate relationship to the plurality of prongs 601. Keeper 602 may extend from shared base 208 in a generally upstanding and perpendicular fashion and generally parallel with the plurality of prongs 601. In this exemplary embodiment, the keeper 602 may be made with a clamp-like device to grip otherwise engage the leg frame after insertion of the leg frame—for example, a small clothespin-type clamp. The keeper 602 may also include grooves on one or more of its surfaces to prevent the diaphragm game caller from slipping. Other suitable holding means may be used in other exemplary embodiments. Together and in tandem, the at least one prong 601 with keeper 602 form a prong/keeper assembly 209. In a further embodiment, at least one prong 601, in a desired quantity, may be placed on a shared base 208 or multiple bases without a keeper 602.

Figure 7:
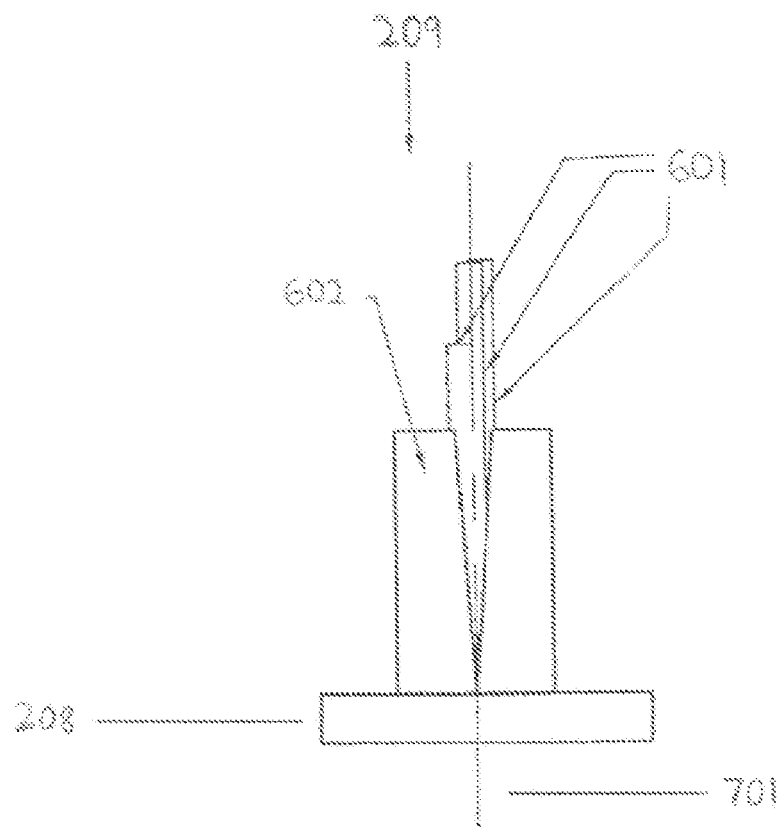
FIG. 7 is a schematic end elevation view of an exemplary embodiment of a prong/keeper assembly of the present invention in reference to a central planar line.
Figure 8:
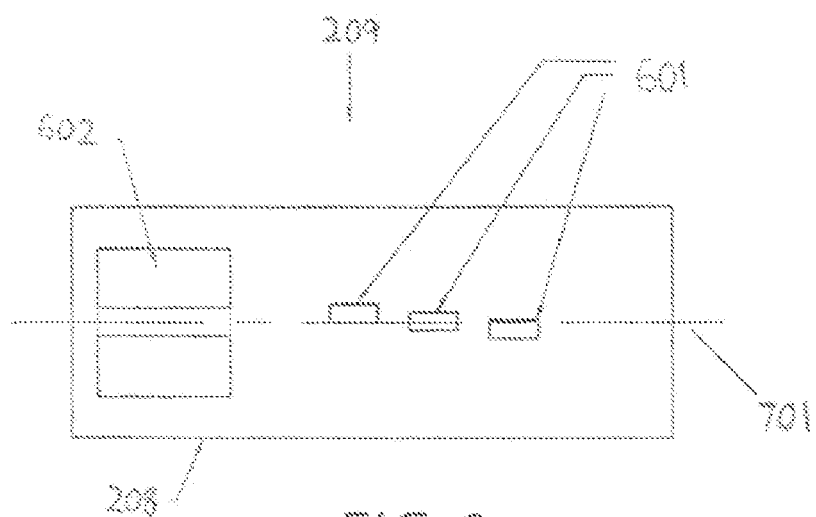
FIG. 8 is a schematic top plan view of an exemplary embodiment of the prong/keeper assembly of FIG. 7 in reference to a central planar line.

FIGS. 7 and 8 show exemplary embodiments of the distance and spacing of the plurality of prongs 601 and the keeper 602 to each other. The distance and spacing of the plurality of prongs 601 and the keeper 602 from, and in relationship to, a generally planar line 701 extending generally centrally from and beyond a bottom of keeper 602 are also shown. The keeper 602 and prongs 601 are not limited to what is shown, but may be sized differently or spaced farther apart or closer together, both horizontally and/or vertically.

Figure 9:
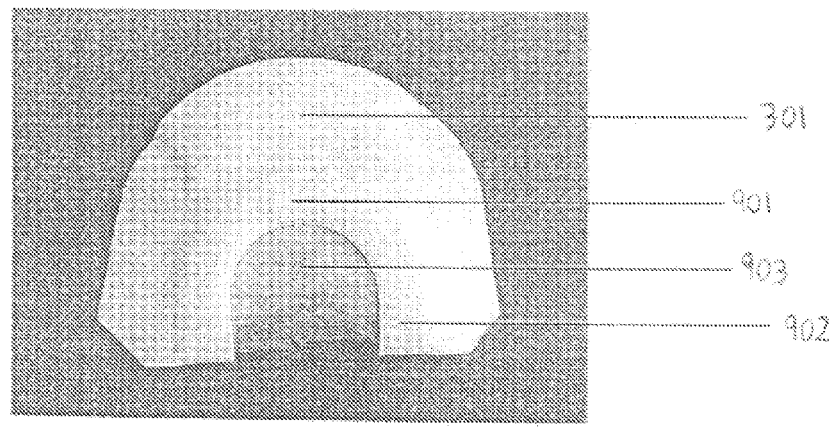
FIG. 9 is a side elevation view of an example of a diaphragm game caller.

FIG. 9 shows an exemplary embodiment of a diaphragm game caller 301 for reference to its relationship and interaction with prong/keeper assembly 209. In this example, a diaphragm game caller 301 is generally constructed with one or more flexible, generally flat, sheet-like diaphragms 903 retained and held in tension by, across, and between a generally 'U' shaped frame 901. The pluralities of diaphragms 903 may generally be overlying each other, in a stacked fashion, across 'U' shaped frame 901, so that each diaphragm 903 may have a surface area free from the 'U' shaped frame 901. Furthermore, each diaphragm 903 may have an edge free from the 'U' shaped frame 901 to vibrate by exhausted pulmonary air when diaphragm game caller 301 is employed in a user's mouth. The general construction and pattern of diaphragm game caller 301 is a normal and well-known representation of a typically patterned and constructed diaphragm game caller 301. In other exemplary embodiments, a prong/keeper assembly may be suitably configured to function with other diaphragm game caller configurations.

Figure 10:
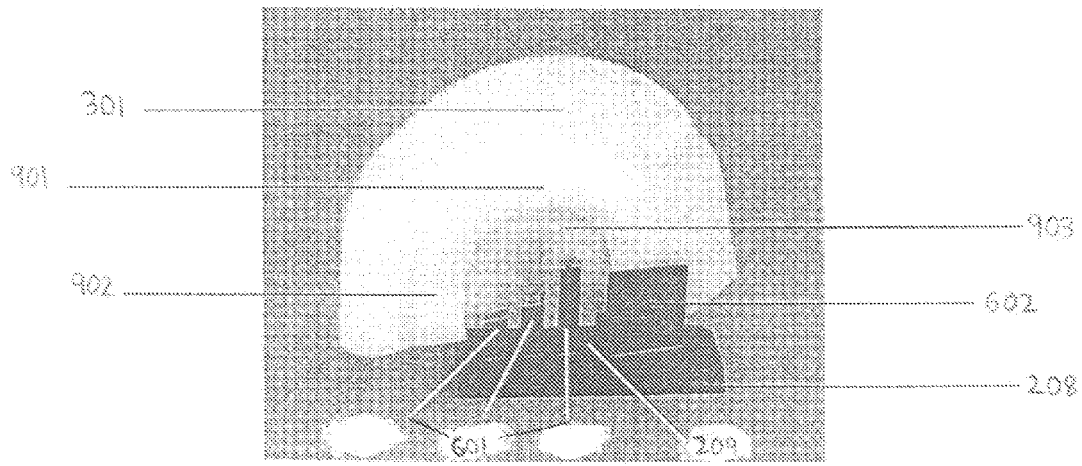
FIG. 10 is a perspective view of the prong/keeper assembly of FIG. 6 in use with the diaphragm game caller of FIG. 9.

FIG. 10 shows an example of a diaphragm game caller 301 fixedly secured by keeper 602 with the surface area of each individual diaphragm 903 separated and held apart from opposing overlying surface areas of other diaphragms 903 by the prongs 601. By separated and held apart, it should be understood to mean that a prong facilitates at least some space between opposing surfaces of diaphragms. The prongs 601 are of generally sufficient quantity, length, width, and breadth to facilitate the insertion, individually, of the prongs 601 between two opposing surface areas of diaphragms 903. In some exemplary embodiments, more than one prong may be adapted to be positioned between opposing surfaces of diaphragms. The prongs 601 may be generally parallel with the diaphragms. In one example, the prongs 601 may be individually and successively inserted inwardly so as to place one prong 601 between each individual diaphragm 903, separating the surface area of one diaphragm 903 from an opposing overlying surface area of another diaphragm 903. The prongs 601 of prong/keeper assembly 209 each individually separate two opposing surface areas of the plurality of generally flat, overlying diaphragms 903. Insertion of the plurality of prongs 601 between the multiple opposing surface areas of the plurality of diaphragms 903 renders the diaphragms 903 separated and held apart. Other suitable methods of inserting a prong between opposing surfaces of diaphragms may be utilized (e.g., simultaneous insertion of multiple prongs). Before, after, or while completing the insertion of the prongs 601, the leg frame 902 of the diaphragm game caller 301 may inserted inwardly into the opening of the keeper 602 until the sloped sides of the keeper 602 firmly contact the leg frame 902, thus securing the diaphragm game caller 301. Other suitable means for engaging a diaphragm game caller by a keeper may be utilized in other exemplary embodiments of the invention. Diaphragm game caller 301 is thus rendered detachably secured by and to prong/keeper assembly 209.

In a further embodiment, a handle or attaching device may be provided in association with a base to allow a user to manipulate and slide one or more prongs 601 back and forth between diaphragms 903 as a cleaning apparatus. In another embodiment, one or more of the prongs 601 may be made with an enlarged or bulbous end to serve as a cleaning apparatus between the diaphragms.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A container for holding at least one diaphragm game caller having a plurality of diaphragms, said container comprising:
    a reservoir; and a lid adapted to be moved between an open position and a closed position in relation to said reservoir, said lid comprising means for holding said diaphragm game caller such that said diaphragms of said diaphragm game caller are separated.

2. The container of claim 1 wherein said lid is connected to said reservoir by a hinge.

3. The container of claim 1 further comprising means for securing said lid upon said reservoir when said lid is in said closed position.

4. The container of claim 3 wherein said securing means comprises a latch in association with said lid and a latch catch in association with said reservoir.

5. The container of claim 4 wherein said latch comprises a slot adapted to receive said latch catch.

6. The container of claim 3 wherein said securing means further comprises a gasket positioned around an underside of said lid.

7. The container of claim 3 wherein said securing means renders the container substantially watertight when the container is in said closed position.

8. The container of claim 1 wherein said means is generally linearly positioned along said lid.

9. The container of claim 1 wherein said means is detachable from said lid.

10. The container of claim 1 wherein said lid further comprises a concave portion that extends into said reservoir when said lid is in said closed position.

11. The container of claim 1 wherein said means comprises at least one prong for separating said diaphragms of said diaphragm game call.

12. The container of claim 11 wherein said prong comprises a bulbous end.

13. The container of claim 1 wherein said means comprises a clip for holding said diaphragm game call.

14. A container for at least one diaphragm game caller having a plurality of diaphragms, said container comprising:
   a reservoir; and
   a lid adapted to be moved between an open position and a closed position in relation to said reservoir, said lid comprising at least one prong for separating said diaphragms of said diaphragm game caller.

15. The container of claim 14 wherein said lid is connected to said reservoir by a hinge.

16. The container of claim 14 wherein said container is watertight when said lid is in said closed position.

17. The container of claim 14 wherein said lid further comprises a clip for holding said diaphragm game caller.

18. A method for cleaning at least one diaphragm game caller having multiple diaphragms, said method comprising:
   providing a container comprising:
      (a) a reservoir; and
      (b) a lid adapted to be moved between an open position and a closed position in relation to said reservoir, said lid comprising at least one prong for separating said diaphragms of said diaphragm game caller
   placing said lid in said open position;
   separating said diaphragms of said game caller using said at least one prong;
   agitating said container with a cleaning agent in said reservoir and said lid in said closed position.

19. The method of claim 18 further comprising the steps of:
   placing said lid in said open position after agitating said container; and
   emptying said cleaning agent from said container.

20. The method of claim 18 further comprising the step of allowing said diaphragm game caller to dry for a desired amount of time.

21. The method of claim 18 wherein said container is substantially watertight during said agitation step.

22. An apparatus for holding a diaphragm game caller with multiple diaphragms such that the diaphragms are separated, comprising:
   a base;
   a keeper adapted to hold the diaphragm game caller;
   a plurality of prongs adapted to separate and keep apart a plurality of diaphragms of the diaphragm game caller;
   wherein said keeper and each of said plurality of prongs are generally linearly positioned atop said base.

23. The apparatus of claim 22, wherein at least one of said plurality of prongs comprises a bulbous end.

24. The apparatus of claim 22, wherein said keeper is a clip.

25. The apparatus of claim 22, wherein said plurality of prongs is adapted to separate two diaphragms.

26. The apparatus of claim 22, wherein said plurality of prongs is adapted to separate three diaphragms.

27. The apparatus of claim 22, wherein said plurality of prongs is adapted to separate four diaphragms.

28. The apparatus of claim 22, wherein at least one of said plurality of prongs varies in size from the remaining prongs.

29. The apparatus of claim 28, wherein the prong closest to said keeper is shorter than the remaining prongs.

30. The apparatus of claim 22, further comprising a means to attach said base to a storage container.

31. The apparatus of claim 22, further comprising a means to detach said base from a storage container.

32. The apparatus of claim 22, wherein said keeper holds the diaphragm game caller by gripping a leg frame of the diaphragm game caller.

33. The apparatus of claim 22, wherein said keeper further comprises grooves on at least one surface of said keeper.

* * * * *